US006633696B1

(12) United States Patent
Vahala et al.

(10) Patent No.: US 6,633,696 B1
(45) Date of Patent: Oct. 14, 2003

(54) RESONANT OPTICAL WAVE POWER CONTROL DEVICES AND METHODS

(75) Inventors: Kerry J Vahala, San Gabriel, CA (US); Amnon Yariv, San Marino, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/454,719

(22) Filed: Dec. 7, 1999

Related U.S. Application Data

(60) Provisional application No. 60/111,484, filed on Dec. 7, 1998.

(51) Int. Cl.$^7$ ............................... G02B 6/26; G02F 1/01
(52) U.S. Cl. ............................... 385/27; 385/1; 385/16; 385/28; 385/50
(58) Field of Search ............................... 385/24, 27–29, 385/39, 40, 48, 50, 1–3, 14, 16

(56) References Cited

U.S. PATENT DOCUMENTS

| | | | | |
|---|---|---|---|---|
| 3,589,794 A | * | 6/1971 | Marcatili | |
| 3,760,297 A | * | 9/1973 | Thompson | |
| 4,282,499 A | * | 8/1981 | DeFonzo | 333/231 |
| 4,695,121 A | | 9/1987 | Mahapatra et al. | |
| 5,343,490 A | * | 8/1994 | McCall | 372/94 |
| 5,878,070 A | | 3/1999 | Ho et al. | 372/92 |
| 6,052,495 A | * | 4/2000 | Little et al. | 385/2 |
| 6,078,605 A | | 6/2000 | Little et al. | |
| 6,101,300 A | * | 8/2000 | Fan et al. | 385/27 |
| 6,222,964 B1 | * | 4/2001 | Sadot et al. | 385/40 |
| 2003/0021518 A1 | * | 1/2003 | Simirnov et al. | 385/15 |

FOREIGN PATENT DOCUMENTS

| | | | | |
|---|---|---|---|---|
| FR | 2703473 A1 | * | 10/1994 | 385/14 |
| JP | 5-203826 A | * | 8/1993 | |
| WO | WO 98/05995 | * | 2/1998 | |

OTHER PUBLICATIONS

S. Schiller et al. Fused–silica monolithic total–internal–reflection resonator. Optics Letters, vol. 17 No. 5, pp. 378–380. Mar. 1992.*
J.C. Knight et al. Phase–matched excitation of whispering-gallery–mode resonances by a fiber taper. Optics Letters, vol. 22 No. 15, pp. 1129–1131. Aug. 1997.*
A. Yariv. Universal relations for coupling of optical power between microresonators and dielectric waveguides. Electronics Letters, vol. 36 No. 4, pp. 321–322. Feb. 2000.*
Little et al., "Wavelength Switching and Routing Using Absorption and Resonance", IEEE Photonics Technology Letters, Jun. 1998, vol. 10, No. 6, pp. 816–818.

* cited by examiner

Primary Examiner—Rodney Bovernick
Assistant Examiner—Mike Stahl
(74) Attorney, Agent, or Firm—Bingham McCutchen LLP; Scott R. Miller

(57) ABSTRACT

An optical wave power control device and method enables signal control, such as modulation and switching, to be effected within an uninterrupted propagation element, e.g. an optical fiber or planar waveguide. The propagation element is configured such that a portion of its wave guided power encompasses the exterior surface of the element, intercepting the periphery of an adjacent high Q volumetric resonator. Power of a chosen resonant wavelength is coupled into the resonator, where it circulates with very low loss in accordance with the principles of a whispering gallery mode device, and returns energy to the propagation element. By introducing loss within the resonator, the propagated power can be varied between substantially full and substantially zero amplitudes. Loss factors can be maintained such that the resonator is overcoupled, i.e. parasitic losses are less than coupling losses, and a critical coupling condition exists in which a small swing in the control effect causes a disproportionate change in the optical output signal.

84 Claims, 7 Drawing Sheets

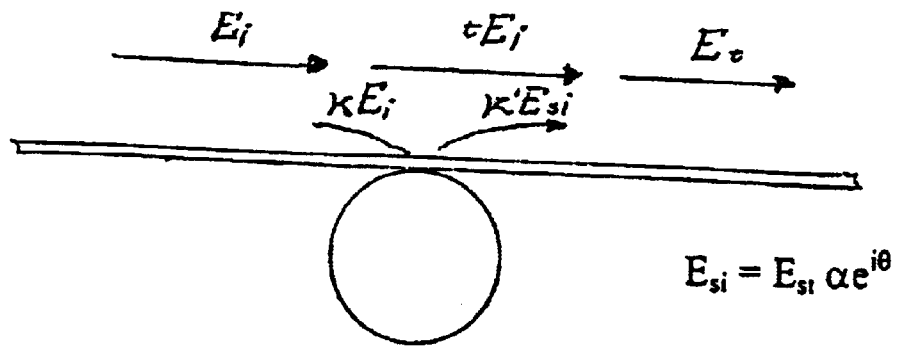
FIG. 10
FIG. 5
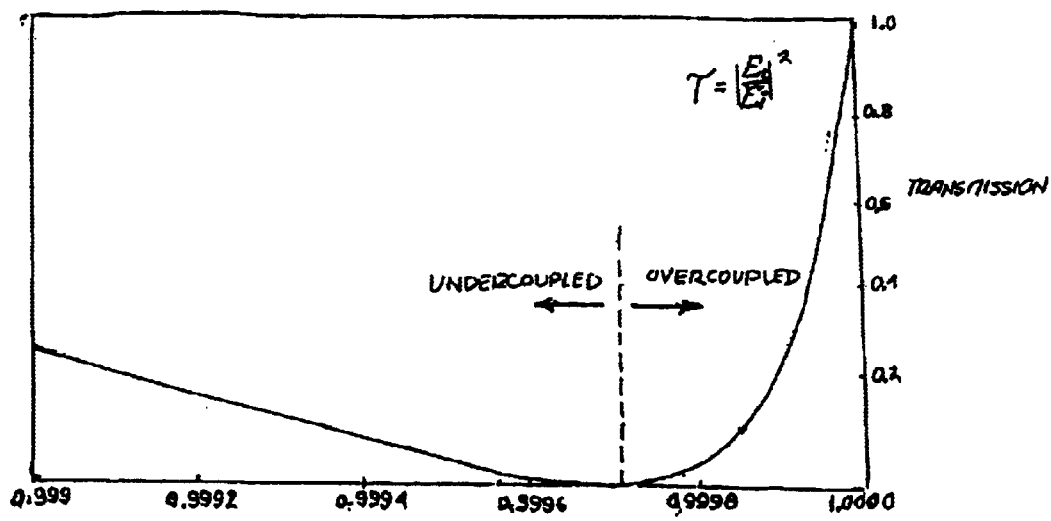

RESONANT OPTICAL WAVE POWER CONTROL DEVICES AND METHODS

This application relies for priority on the previously field provisional application, No. 60/111,484 filed Dec. 7, 1998, and entitled, "An All-Fiber-Optic Modulator".

FIELD OF THE INVENTION

This invention relates to optical wave power control devices and methods, and more particularly to systems, devices and methods for modulating and switching signals transmitted in optical waveguides.

BACKGROUND OF THE INVENTION

In the now rapidly expanding technology of fiber optics, a number of discrete devices and subsystems have been developed to modulate, or otherwise control, optical beams that are at specific wavelengths. The approaches heretofore used, however, have not fully overcome one or more problems inherent in the requirements imposed by modern systems. Present day communication systems increasingly use individual waveguide fibers to carry densely wavelength multiplexed optical beams, and modulate the beams at very high digital data rates or with wideband analog data, or both.

For example, it is known how to modulate the power of a monofrequency laser source, typically a semiconductor laser. Using such a source, one must accept a limited modulation bandwidth because of constraints on the rate at which the laser can be turned on and off. In addition, this type of modulation introduces chirping, or spreading of the bandwidth of the signal from the monofrequency laser, so that dispersion variations with wavelength in signals that are transmitted in optical fiber over a substantial distance place an inherent limit on that distance. This approach does have the advantage, as compared to some other systems, of modulating at the source, so that continuity in the optical fiber structure can be preserved. However, semiconductor lasers that are modulated must be coupled to optical waveguides by means which introduce problems with yield, reliability and cost. Consequently, the limitations mentioned above are such that long distance transmission systems tend to employ external modulators.

The two forms of external modulators that are currently employed are monolithic waveguide devices. A widely used lithium niobate modulator of this type is based on a Mach-Zehnder interferometer and is being employed in long distance transmission systems and other applications because it creates clean waveforms at the highest data rates and produces a minimal amount of chirping. As a monolithic waveguide device, it must be coupled at its input and output to an optical fiber, which requires costly packaging and assembly but even so introduces a substantial mismatch between the chip waveguide and the optical fiber waveguide, thus entailing losses in the range of about 5 db. Furthermore, it is polarization sensitive and must be actively temperature stabilized to compensate for the thermal drift characteristics of the interferometer A second waveguide device, more recently introduced, is also a monolithic on-chip device using an electro-absorption effect. This modulator is fabricated integrally with a semiconductor laser, requiring sophisticated and costly fabrication technology that inevitably decreases the yield of the overall laser device. In addition, such a device is subject to chirping, which places a limitation on high (10 gigabit/sec and higher) modulation rates. The integral laser/modulator chip must be coupled to optical fiber—again adding cost to manufacturing.

There are a number of other patents of recent interest which disclose variants on the monolithic device structure, but all require a matching technique to be used to function with an optical fiber. Mention of signal modulation is made in at least two patents which often employ dielectric microcavities for recirculating electromagnetic wave energy at optical wavelengths. "Whispering gallery mode" (WGM) structures, which comprise microresonators of generally spherical, ring, or disc-like configuration, are of dielectric material, e.g. glass or silica. They are essentially totally reflective and support internal modes at frequencies determined by size and other factors, with very low losses, and therefore high Q. They are being investigated for use in a number of different optical configurations. U.S. Pat. No. 5,343,490 to McCall, for example, discloses a closed loop WGM system configured as a thin element, described as "an active material element of thickness characteristically of a maximum of a half wavelength . . . " (Col; 1, lines 62–63). Disks are described that have thicknesses in the range of 1,000–1,500 Å and have at least one optically active layer, sandwiched between thicker barrier layers. The optically active material may be InGaAs and the barrier layers InGaAsP material, for example. Fabricated into a microcavity using photolithographic techniques, the structure is described as having multiple potential functions. These comprise optically pumped single quantum well to multiple quantum well structures and various two port and three port devices which may function as, for example, detectors, data amplifiers, and current meters. It is mentioned in passing, as at Col. 6, lines 3–23, that the output may be modulated or unmodulated, but apart from general statements (e.g., "delicate destructive phase interference" in terms of canceling an unmodulated output) there is no teaching as to how modulation, much less high speed modulation could be effected. Continued evolution of this approach may lead to practical modulators at some point in time, but even then would face the barriers presented by the need for matching to fiber waveguide structures, and in cost, and in performance specifications such as insertion loss.

A somewhat related approach is described in the "Photonic Wire Microcavity Light Emitting Devices" application of Ho, et al. in U.S. Pat. No. 5,878,070. The inventors also describe a WGM microcavity with a gain medium of InGaAs sandwiched between InGaAsP layers of submicron thickness, but closely surround a ring of this optically active structure with an arc of lower refractive index waveguide material in a general U-shape, the side arms of which may be tapered (FIG. 9). With this arrangement, there is resonant photon tunneling from the active material of the gain cavity to the output-coupled waveguide, which serves as the core of the structure. The possibility of modulation, by varying the pumping power of the active medium section, is also suggested, (Col. 15, lines 54–58) with no specific implementation being described. Since the concept is based upon a discrete and particular active waveguide core and an arc of low refractive wave index material serving as an output waveguide in close association to it, is evident that the same problems that are presented by the McCall disclosure are also present here.

In addition to the rapidly increasing use of fiber optic systems, there is constant evolution toward denser wavelength division multiplexing and higher data rates per channel. This in turn means that factors such as spectral bandwidth, frequency stability, compactness and reproducibility are of added importance, and place added requirements on any new approach.

An all fiber modulator, one that assures the continuity of the wave energy transmitted along an optical waveguide, will therefore be of substantial potential benefit, if it can be provided in a form that offers sufficient dynamic range, and minimizes insertion losses while being capable of handling high data rates. It is evident that such a device, if wavelength sensitive, can also be used as an on-off switch, or a switchable bandpass filter, where required for specific applications. Preferably, for complex switching and routing systems having many channels, units using the same concepts can be fabricated using microlithographic or micromachining techniques.

SUMMARY OF THE INVENTION

These and other objectives of the invention are met by a power transfer structure and modes of operation which variably attenuate (modulates) or completely block (switches off) the power propagated in a section of an optical waveguide. To this end a short section of an optical waveguide is modified to couple power into an adjacent high Q resonator microcavity in which wave energy of a resonant mode recirculates with power accumulation before return to the waveguide. In a first possible mode of operation, the optical losses upon one round trip in the resonator are such that resonator to wave-guide coupling losses are greater than other resonator losses. This is referred to as an over-coupled condition, under which condition the resonator minimally attenuates resonant optical power incident from the wave guide resulting in maximal waveguide transmission. By increase of the resonator loss per round trip (with resonator to wave guide coupling loss fixed) to bring it into balance with resonator to wave guide coupling loss, the condition goes from one of over coupling to critical coupling, a condition in which wave guide power transmission is zero. The transmission along the waveguide is thereby modulated from essentially unity to essentially zero. This requires a very small change in the round-trip loss induced by a control element, which may be external to the resonator or alternatively based upon varying a property of the resonator itself. Such modulation provides very high data rate capability with an all waveguide transmission structure that involves no discontinuities and requires no coupling of dissimilar elements and has minimal insertion loss. Operation between a critical coupling condition and an undercoupled condition is also feasible for the purpose of modulation. In this second mode of operation round-trip resonator to wave-guide coupling loss is in balance with resonator losses before increase of the resonator loss by the control element. In this condition wave guide transmission is zero as described above. By increase of the resonator loss beyond the condition of balance a condition of under-coupling is obtained in which wave-guide transmission is restored to a value approaching unity transmission. Both the first and second modes of operation can also be realized using negative optical loss (or optical gain), however, the sense in which the optical gain is applied is opposite to that for positive optical loss. For example, in the first mode of operation, the losses would be such that a condition of critical coupling exists prior to application of the optical gain. The control element would then apply optical gain to achieve a condition of overcoupling, thereby modulating the transmission from essentially zero to essentially unity.

Third and fourth modes of operation parallel the first and second modes of operation in that variation between conditions of over coupling and critical coupling (mode 1 and mode 3) or between conditions critical coupling and under coupling (mode 2 and mode 4) is used to modulate waveguide transmission. However, in these modes of operation, the resonator to wave guide coupling loss is varied (as opposed to being held fixed) while the other resonator losses are held. fixed. The control element in these cases effects a variation in the resonator to wave guide coupling loss. Otherwise, the principle of operation is essentially the same as that for modes 1 and 2.

In a fifth mode of operation, the losses are such that the resonator is critically coupled to the wave guide. The optical path length of the resonator is then varied to shift the resonant frequency of the resonator into or away from resonance with the desired optical wave and thereby effect modulation. Optical path length variation can be achieved, for example, by electrooptic or nonlinear optical induced variation of the resonator dielectric constant.

Since the combined elements are very small and frequency specific a number of units can be used in combination with separate controls for dense wavelength division multiplexing. Switching systems and multiple modulation arrangements, with or without in-fiber signal sources or amplifiers, can be arrayed as needed for particular applications.

Further in accordance with the invention the optical waveguide or fiber may comprise a known core-cladding structure tapered down to a short section of much smaller cross-section. In this section the fiber has only a vestigial core, and power is confined within the reduced cladding and a limited radius of the surrounding environment. The WGM resonator periphery is within the external field in the narrow waist region providing a field coupling and the resonance geometry provides an equatorial internal surface that has essentially total internal reflection and/or wave guiding effect. This establishes a high Q wave recirculation path within an internal circumference of the resonator. The field coupling transfers power into the resonator, which itself does not fully confine the waves, and a part of the power returns to the waveguide as output. A loss control mechanism on, within, or adjacent to the resonator and influencing the exterior or interior fields introduces further loss, the value of which affects the power transmitted through the fiber. The loss control mechanism may advantageously be any form of transducer having a signal variable optical transmissivity characteristic at the chosen wavelength. As one example, an optically active combination of layers of semiconductor materials positioned on or near the resonator is of convenient size, efficiency and signal responsiveness for the desired control. These materials could be bulk or quantum well materials and their absorption varied by a photo pumping, injection current, or applied voltage. As another example, a variable coupling mechanism that couples resonator power to a separate structure such as another wave guide could be positioned to couple power from the resonator and thereby vary its roundtrip loss.

The resonator element is conveniently a silica microsphere, disc, or ring sized to have resonant modes at one or more chosen wavelengths, and of the order of about 1 to 1000 microns in diameter. Advantageously the equatorial diameter is selected with respect to data rate and spectral linewidth, as well as Q, and very small diameters (e.g. 30 microns) are needed for present and anticipated requirements. Likewise resonator shape and size affect the frequency separation between adjacent resonator modes. This frequency separation must at a minimum exceed the desired modulation rate or signal bandwidth, however, in practice it must be wide enough to encompass the spectral extent of optical waves co-propagating in the wave guide. To this end, eccentric resonator structures are desirable such as oblate spheroids, discs, rings and oblongs. To be positioned and held in proper relation to the fiber waist, which may be of less than 10 micron diameter, it can be attached directly, with, for example, the controllable loss transducer being on the opposite side from the fiber.

Both theory and practice establish that the effective range of loss control that is to be observed need vary only between an overcoupled condition in which transmission is unity, or only slightly less, and a critical coupling condition in which transmission is attenuated by in excess of 90%. Because this results, in real terms, from only a small change in applied loss by a loss control mechanism, this approach is therefore preferred to operation between a critical condition and an undercoupled condition and to operation in which criticality is fixed while resonant frequency is varied. In the latter cases different dynamic ranges must be recognized as to both control and power.

The modulator is polarization sensitive, which is typically not of importance when it can be placed close to a source laser which provides a polarized output. Where it is desired to provide polarization insensitivity, two resonators, such as silica microspheres, can be disposed in orthogonal positions relative to the central axis of the fiber. The geometry of the resonator itself, as well as the material used, can be varied as long as the desired Q value and resonator modal frequency separation is maintained. Thus oblate, ring, disc, elliptical, oblong, annular and polygon shapes, among others, are known and can be employed in this application.

To utilize the concepts for concurrent modulation of different wavelength signals multiplexed on the same fiber, it is merely required to dispose a series of resonator/loss controller combinations along one narrow waist section, or along separate taper sections of the fiber. Each resonator is responsive only to its own chosen wavelength and the wavelengths are separately modulated with minimal crosstalk. In-fiber laser sources, such as DFB fiber lasers, can also be employed in the series, adding optical pumping in co-directional or counter-directional relation. The integration of multiple resonator-based modulators in a wavelength division multiplex system provides a wavelength addressable transmission system.

As described above, for concurrent modulation and for wavelength specific modulation of one co-propagated wave with other waves, an appropriate frequency separation between adjacent resonances is established to prevent unintended interference effects. Further the adjacent modal frequency separations within resonators, which support multiple modes at different frequencies, are arranged to exceed the total bandwidth of a frequency range of interest, such as that spanned by the number of WDM channels on the waveguide fiber. Resonator geometries are adaptable to meet these requirements.

BRIEF DESCRIPTION OF THE DRAWINGS

A better understanding of the invention may be had by reference to the following description, taken in conjunction with the accompanying, in which:

FIG. 5 is a graph of the relation between waveguide transmission and resonator amplitude attenuation per round trip (a measure of round trip resonator loss) for calculated values;

FIG. 10 is a schematic representation of field amplitudes and coupling coefficients in modeling a resonance-based control system;

DETAILED DESCRIPTION OF THE INVENTION

Figure 1:
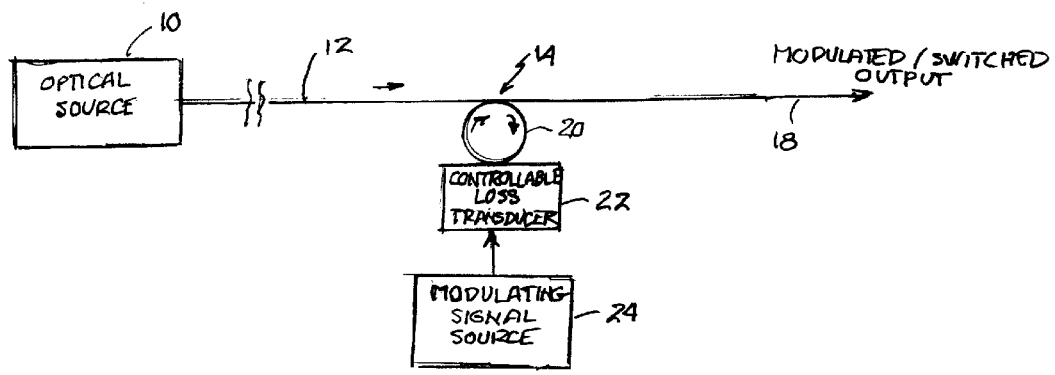
FIG. 1 is a simplified block diagram and perspective representation of an all fiber optical wave control device in accordance with the invention.
Figure 3:
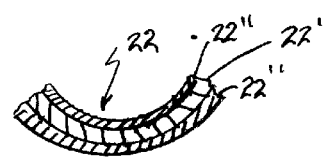
FIG. 3 is a simplified representation of the cross section of an optical absorber that may be utilized as a loss element in the transducer of FIG. 2.
Figure 2:
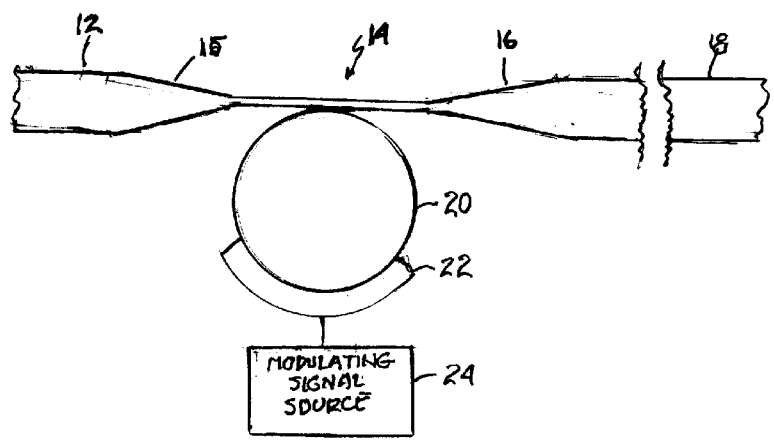
FIG. 2 is a fragmentary and idealized representation of a tapered optical fiber and microsphere with a controllable loss element which may be utilized in the arrangement of FIG. 1.

An optical wave power modulator in accordance with the invention, referring now to FIGS. 1 and 2 particularly, derives mono-frequency optical power from a source 10, such as a semiconductor laser. Since the device in the present example, a dielectric microcavity resonator, is polarization sensitive, the characteristic polarization of the optical wave is preserved by placing the device in relatively close proximity to the laser 10 or by using polarization maintaining fiber between the source 10 and the dielectric microcavity. For this purpose, a short length of optical fiber waveguide 12 of conventional diameter such as about 92–125 microns includes an integral waist region 14 of much smaller diameter, typically in the range of 1–10 microns. The waist region 14 transitions the conventional fiber 12 at each end by integral converging and diverging tapered sections 15 and 16. An outgoing length of conventionally-sized fiber 18 carries the modulated signal.

In the waist region 14 of the waveguide a high Q cavity resonator 20 operating as a WGM device is disposed in contact with, or at a spacing of the order of a few microns, from the surface of the small waist 14. The high Q resonator 20 diameter is sized and shaped to have at least one resonant mode at a chosen signal frequency. Other resonances may exist within the resonator 20, but are of no effect as to a different mono-frequency signal. If the input waves comprise more than one frequency, the resonator remains transparent to all but the chosen frequency as long as the modes are displaced from the wave frequencies. Assuming for purposes of example only that 1550 nm communication signal wavelength is chosen, the dielectric resonator 20, here a silica microsphere, will be in the range of approximately 1–100 microns in diameter. While a WGM resonator can be provided that has very low loss and accordingly very high Q, this militates against adequate spectral linewidth and use with high data rates. Although optical fiber systems face other problems such as group velocity dispersion at very high data rates, the tendency of systems builders is constantly to seek to increase data rate performance. Consequently, at present, rates of about 2.5 to 10 gigabits/sec are being used, necessitating that WGM resonant linewidths be broadened to accommodate these rates. In a practical example, the resonator 20 is 30 microns in diameter for a data rate in the range of 1 to 10 Gb/sec, for a 1550 nm signal. In general, the spectral width of the WGM mode should be larger or equal to twice the width of the desired information bandwidth. The spectral width of the measured power transmission (resonator WGM line width) is related to the resonator quality factor or Q as follows:

$$Q = v_o / \Delta v \qquad \text{Equation (1)}$$

where the half width at half maximum is $\Delta v$, and the WGM center line frequency is $v_o$. For a WGM resonance having a typical telecommunications wavelength of 1550 nm and a data rate of 10 Gbits/sec (5 GHz bandwidth with NRZ format) the required optical bandwidth will be approximately 10 GHz, and the Q, should be 19000 or less. Empirical laboratory data shows that diameters of 30 microns or less provide the needed characteristics, fortuitously because of the extreme compactness and densities that are achievable. To be consistent with the preferred operation mode in the over-coupled to critically coupled range, Q should be decreased and hence spectral linewidth increased by either reducing the round-trip propagation time within the resonator (i.e., reduce resonator size) or by increasing the resonator to wave guide coupling loss. Coupling loss can be increased either by increasing the spatial overlap of resonator modes with the field exterior to the fiber waist, by improving phase-matching conditions between the resonator modes and the taper modes or both.

For positional stability the microsphere 20 is, in the example, attached directly to the waist region 14 of the fiber. A controllable loss transducer 22 in close juxtaposition to the opposite of the silica microsphere 20 from the waist region 14 is driven by a modulating signal source 24 to control the absorption of wave power circulating within and about the resonator 20, thus adding a loss factor per round trip. If the control is analog between limits, then the waveguide power signal is modulated. If the loss control is varied between conditions of maximum and zero transmission, then the unit functions as an on-off switch or as a digital modulator.

The tapered sections, 15, 16 and intermediate waist region 14 of the waveguide may be provided, as is known, by stretching the waveguide under controllable tension as it is softened by one or more fixed or movable heat sources (e.g., torches). Commercially available machines can be used for this purpose in production environments. The consequent reduction in diameter of about one or more orders of magnitude reduces the central core in the core/cladding structure of the optical fiber to vestigial size and function, such that the core no longer serves to propagate the majority of the wave energy. Instead, without significant loss, the wave power in the full diameter fiber transitions into the waist region, where power is confined both within the attenuated cladding material and within a field emanating into the surrounding environment as depicted in fragmentary form in FIG. 4. After propagating through the waist region 14, exterior wave power is recaptured in the diverging tapered region 16 and is again propagated with low loss within the outgoing fiber section 18.

Figure 4:
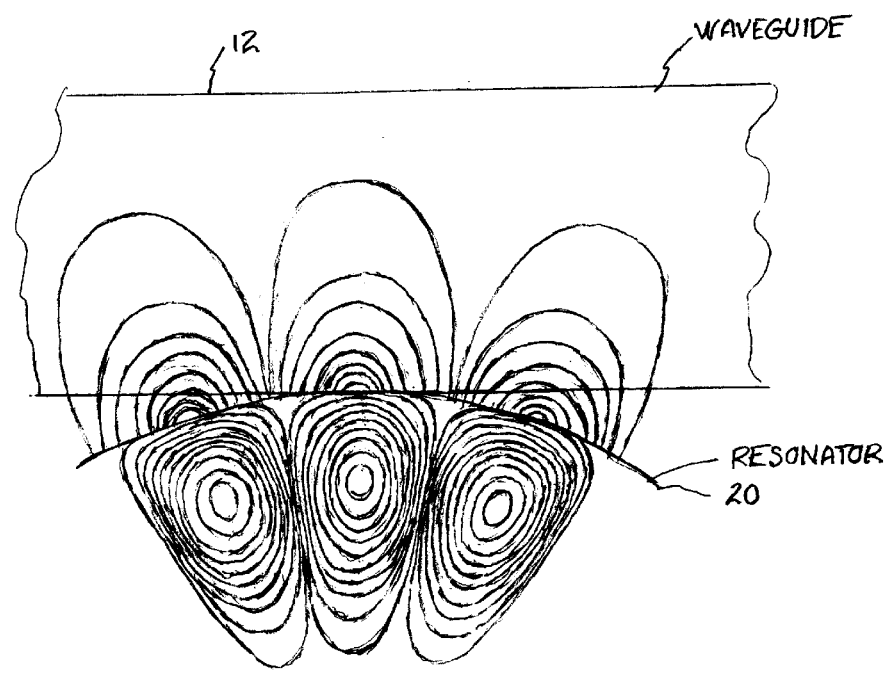
FIG. 4 is a fragmentary depiction of the interaction between fields of electromagnetic wave energy in the example of FIGS. 1 and 2.

The silica microsphere that forms the high Q resonator 20 in this example is coupled to the externally guided power about the waist region 14 of the waveguide. That is, at all times there is a coupling interaction from the principal fiber into the interior of the microsphere 20 via the resonator periphery, as shown in FIG. 4. The resonator 20 additively recirculates the energy with low loss in the "whispering gallery mode", returning a part of the power to the waveguide at the waist 14. There is also coupling to the controllable loss transducer 22 during each round trip. When a resonance exists at the chosen wavelength, the resonator 20 functions with effectively total internal reflection and with minimal internal attenuation and radiative losses. However, the emanating portion of the wave power is still confined and guided, so it is presented for coupling back into the waveguide waist 14. Extremely high Q values (as much as 8 billion have been observed) exist in this whispering gallery mode, seemingly first explicated by Rayleigh in an article entitled "The Problem of the Whispering Gallery" in 1912. The phenomenon has since been investigated both theoretically (as in an article by M. L. Gorodetsky, et al. in Optics Letters 21, 453 (1996)) and in various implementations, as shown in the McCall and Ho patents referenced above. Different WGM devices have been disclosed and investigated in the literature, including discs, rings, polygons, oblate and prolate spheroids. Furthermore, concentricity or approximate concentricity may in some instances not be necessary, since the WGM effect can exist in non-concentric boundary structures such as ellipses or race-track structures.

The controllable loss device 22 can be derived from the class of electrically or optically variable light absorbers that can be controlled. A quantum well structure having controllable properties of photon absorption is particularly suitable, because the transducer 22 can comprise a plurality of layers disposed on or near a part of the circumference of the microsphere 20, with layers comprising both active material (e.g., InGaAs, numbered 22') and buffer layers (InGaAsP numbered 22"), so as to vary the photon absorption within a range controlled by an electrical signal. Such structures are described in detail in both the McCall and Ho et al patents referenced above.

Figure 7:
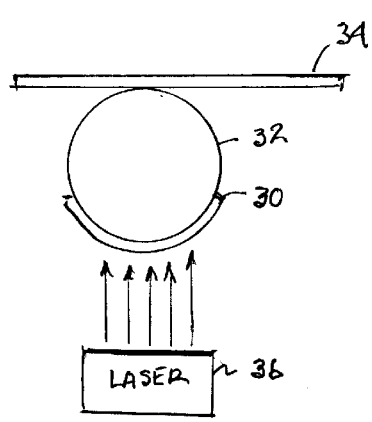
FIG. 7 is a generalized view of a first alternative arrangement for control of resonator loss.

Other available approaches to provide material absorption of the optical waves are based, for example, on the use of semiconductor materials having band gaps which are either (1) larger than the energy of the signal wave photon energy or (2) smaller than the signal photon energy. In either case, as seen in FIG. 7, the semiconductor could be deposited as a layer 30 on a part of the resonator 32 or situated near the resonator, and irradiated by an optical source such as a laser 36. In the former example, optical pumping from the laser 36 generates carriers in the semiconductor layer 30, which causes free carrier absorption of the optical wave thereby taking the resonator from an over-coupled to a critically coupled condition (assuming preferred operation) and reducing modulator transmission. While the modulation rate is determined by the carrier lifetime, this parameter can be shortened by introduction of defects into the semiconductor.

In the latter case, optical pumping from the laser 36 generates carriers which cause band-filling-induced reduction of the optical absorption. In this case the modulator characteristic would be designed for maximum extinction (critical coupling) when there is no optical pumping; which is advantageous since the highest extinction can be "designed" into the device during manufacture. The wave power coupling relationship thus becomes over coupled as optical pumping is applied, and output transmission increases. As above, modulation rate is determined by carrier lifetime.

In both these examples, carriers can be generated in the semiconductors and the modulation (or switching) can result, by the use of electrical rather than optical excitation.

Figure 8:
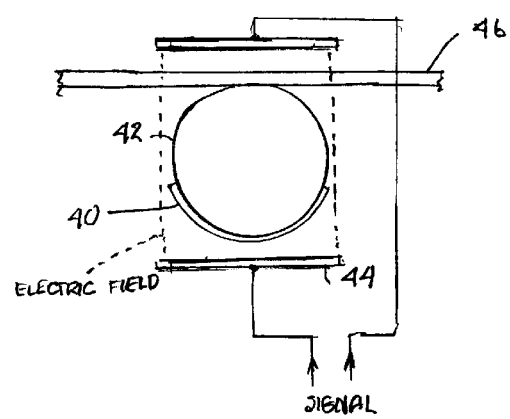
FIG. 8 is a generalized view of a second alternative combination for control of resonator loss.

A different effect using a semiconductor layer 40 on or near a resonator 42 can also be understood by reference to FIG. 8. Here a small parallel plate capacitor 44 spans the resonator 42 and applies a variable field, which can be modulated at a high rate, to the semiconductor layer. In this example the energy gap is selected to be close to but slightly larger than the signal photon energy. The resonator is initially overcoupled and hence wave power transmission in the waveguide 46 is maximum. To increase absorption an electric field is applied to the semiconductor layer 40 via the capacitor 44, and by way of the Franz-Keldysh effect an increase in absorption is experienced by the wave in the resonator 42, thereby taking the resonator to the critical condition. This in turn decreases transmission from the optical waveguide 46 coupling to the resonator 42, and can be applied to modulate (or switch) power in the waveguide 46.

The variation of loss can be effected in other ways, including using a resonator of variable loss material, by varying relative positions of resonator and fiber, or by introducing an element that couples power from the resonator into another structure such as a second waveguide. For the case of coupling to a second waveguide, the coupling loss might feasibly be varied by varying the phase matching condition to the second waveguide as, for example could be done using an electro-optic material. The relatively slow variations achievable with mechanical devices or temperature variations may be fully acceptable as loss control elements for some applications.

Figure 9:
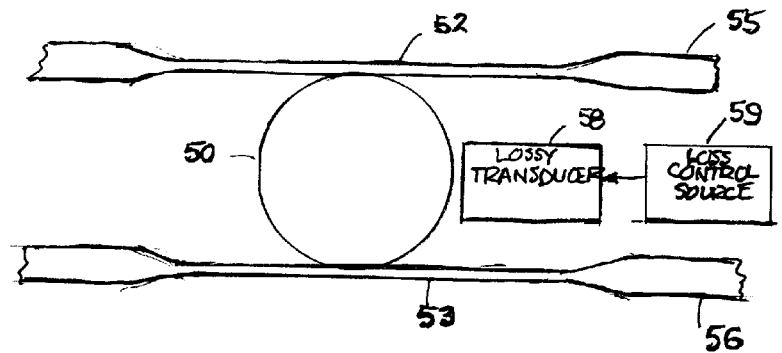
FIG. 9 is a modification in which two optical waveguides interact with a single resonator and in turn with each other.

A double optical waveguide combination with a common resonator 50 is shown in FIG. 9, to which reference is now made. The narrow waist sections 52, 53 and the two optical fiber waveguides 55, 56 are shown, but it should be understood that input sources and output circuits (not shown) can be arranged to utilize the bidirectional properties of the waveguides 55, 56 and resonator 50. Both waveguides 55, 56 are coupled to the resonator 50 as is a loss transducer 58 which is varied by a control source 59 in the critical coupling range as previously described. The coupling is such that the waist sections 52, 53 couple to essentially the same modes of the resonator 50 thereby enabling resonant power transfer from one wave guide to the other under the control of the loss transducer 58. When this coupling is symmetrical with respect to the two waist sections 52, 53 and when the associated resonator to waveguide coupling losses exceed other resonator losses, then the resonator 50 is critically coupled to each wave guide and nearly complete power transfer from one wave guide to the other is possible on resonance. This power transfer is spoiled and the resonator 50 under coupled when resonator loss is increased substantially by the loss transducer 58. In this case, the power transfer is interrupted and resonant power in either waist 52, 53 proceeds with near unity transmission to respective waveguide outputs 55, 56. In this way the device functions as a wavelength addressable 2×2 switch in which signals can be controllably redirected. In all instances wavelength multiplexed signals out of resonance with the modes in the resonator 50 are passed through transparently from input side to output side. The loss transducer element in this 2×2 configuration would be essentially the same as that described for the modulator (1×1 switch) except that the 2×2 switch operates nominally in the critical to under-coupled regime. Bandwidth, modal frequency separation, and other design issues concerning the resonator structure would also be the same as those for the modulator.

The coupling and control principles of the present invention differ substantially and uniquely from prior studies and disclosure as to WGM devices. From these it is known that an evanescent coupling exists, for example, between an optical beam directed into a prism and reflected internally off one face at a point at which a WGM microsphere is externally positioned. The prism will evanescently couple a portion of its wave energy into a recirculating path within the microsphere if the frequency is at one of the resonant modes of the microsphere. It is also known that input optical waves are transmitted out at essentially undiminished power, except for a minimum in the resonance range. A similar effect exists for the combination of a dielectric WGM resonator adjacent a tapered optical fiber waveguide, as has been shown.

However, the ability to employ the recirculating resonant modes and the coupling effects requires understanding and proper use of a number of controlling conditions. Varying the transmitted power output between substantially full transmission and substantially zero transmission, whether in modulation or switching, requires understanding and control of a number of parameters, including the sources of resonator loss. The sources of loss experienced by the circulating wave are varied and distinct, and include:

(1) Loss associated with the portion of the WGM field that is intentionally coupled from the microsphere back into the taper.

(2) Distributed loss associated with the intrinsic properties of the microsphere such as optical absorption in the microsphere material, surface imperfections and surface contamination. With careful material selection and processing, however, pure silica microspheres or discs having smooth surfaces can be prepared that introduce only very low distributed loss.

(3) Parasitic losses, such as any arising from unintended coupling of optical power into modes that are not returned to the fiber waveguide, e.g. radiation modes. By observation, these are found to be very low if proper conditions are observed for coupling.

(4) Loss that is intentionally introduced into the sphere (that is not associated with the coupling to the waveguide taper) to induce modulation or switching.

If the only source of loss is coupling loss [(1) above], conservation of energy dictates that power from input to output will be 100% transmitted. Since past development and practical results show the that non-coupling losses [(2), (3) above] can be made small, they can be ignored in the following analytical model depicted graphically in FIG. 5 and based upon the following set of coupled linear equations for the complex field amplitude, using the quantities defined symbolically in FIG. 10:

Four-port scattering equations:

$$E_{st} = \kappa E_i + t' E_{si} \qquad \text{Equation (2)}$$

$$E_t = \kappa' E_{si} + t E_i \qquad \text{Equation (3)}$$

Round trip propagation condition in sphere:

$$E_{si} = E_{st} \alpha e^{i\theta} \text{ where } \theta = kC \qquad \text{Equation (4)}$$

In equation (4), α gives the resonator amplitude attenuation per round trip associated with one round trip of propagation in the sphere, θ is the phase associated with that propagation, k is the propagation constant of the excited mode, and C is the sphere circumference. Additionally, in equation (4) κ, κ" are the amplitude coupling coefficients from the waveguide to the resonator and vice versa and depend on the device parameters including resonator waveguide field overlaps and phase matching, while t, t' are the four-port transmission amplitudes on the waveguide side and the resonator side (not to be confused with modulator transmission). This model makes it possible to calculate the maximum transmission attenuation as a function of a loss from an unspecified source other than loss factors inherent in the microsphere/waveguide system. The curve in FIG. 5 shows the results of a calculation that assumes numerical values for the coefficient in the model that are consistent with measured Q's in tapered fiber-microsphere system tests. These values are only illustrative. The horizontal axis gives the amplitude attenuation per round trip, "α", induced by the unspecified loss, where α=1 corresponds to no additional loss. At α=1 there is therefore unity transmission of resonant wave power.

The effect of introducing added loss, as seen in FIG. 5, where increasing coupling loss is to the left on the horizontal axis, is to increase attenuation until there is zero power transmitted. At this point added loss per round trip is the sole cause, in this model, of the total drop in attenuation, and is achieved in the example used for FIG. 5 at an α of only about 0.9997. Such a condition, known in microwave theory as "critical coupling", thus requires only a minute amount of added loss to induce a large swing in the transmitted waveguide power. Modification of the state of the recirculating resonator in this manner thus provides the basis for the exemplifications of the invention. Moreover, the resonant modes provide precise frequency selectivity.

Figure 6:
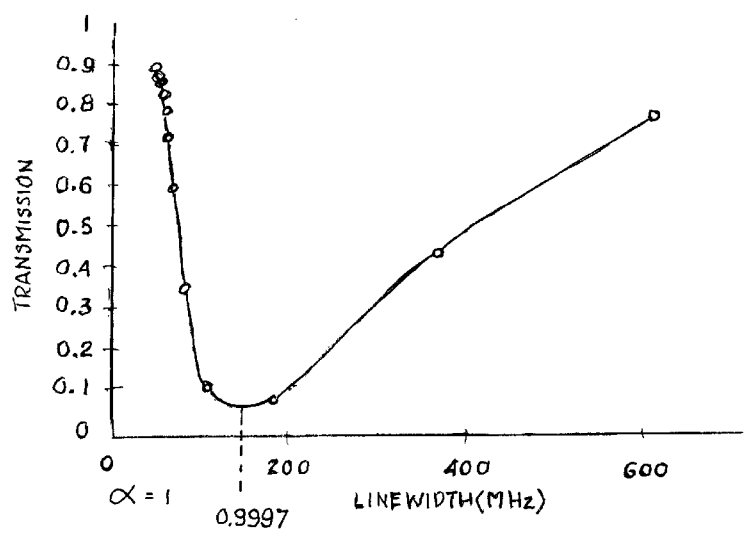
FIG. 6 is a graph of transmission values in relation to modal linewidth derived experimentally and confirming the calculated values of FIG. 5.

The calculated model results shown in the curve in FIG. 5 are fully confirmed by experimental measurements of a tapered optical fiber/microsphere modulator, as shown in FIG. 6. These measurements were made with an approximately 3 micron waist fiber diameter and an approximately 300 micron diameter microsphere, adjacent to which a moveable microprobe was variably positioned to introduce incrementally controlled coupling loss. Due to the nature of the study, the horizontal axis is related to linewidth instead of α, and the curve is reversed but the proof of critical coupling is clear. Significantly, critical coupling exists over a very small a variation, and the total loss at α=1.000 is observed to be small. This is also meaningful in other respects, because it shows that distributed losses and parasitic losses in the measured structure are not only low, but less than tapered fiber to microsphere coupling losses. Thus an "overcoupled" condition naturally exists when there is no intentionally added loss. The experimental work empirically demonstrates further that the characteristics of the model for added coupling loss are reliable.

As described earlier, operation of an optical modulator or switch employing a microresonator can be posited where an undercoupled condition exists, but would entail greater spreads in attenuation values, and likely be subject to lower dynamic ranges, and require more power. However, modulation from the critical coupling part into the overcoupled regime is preferable because the needed attenuation is so small that the loss control transducer or device can be minute and minimally invasive to the resonator modes. In addition, power consumption is minimized in this mode of operation. Depending on whether the attenuator is non-absorbing or absorbing in the absence of a control signal, the modulator or switch will be inverting or non-inverting, respectively.

Figure 11:
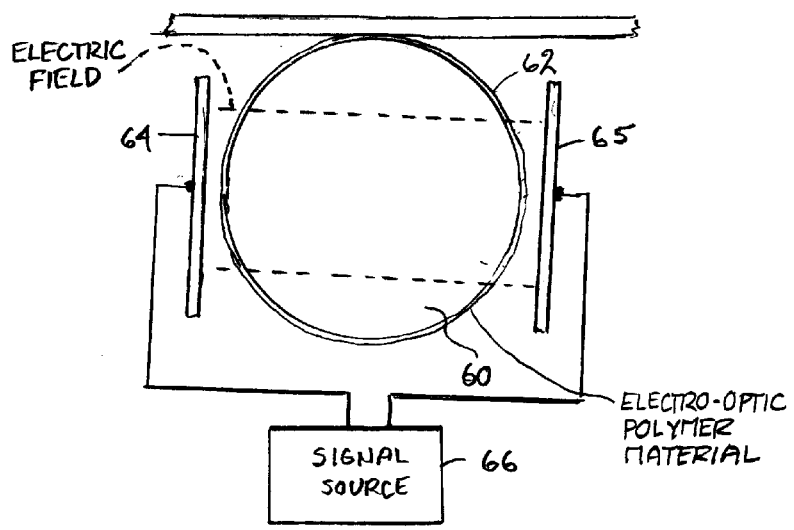
FIG. 11 is a simplified representation of a system.for varying waveguide transmission by shifting the frequency of resonance modes.
Figure 12:
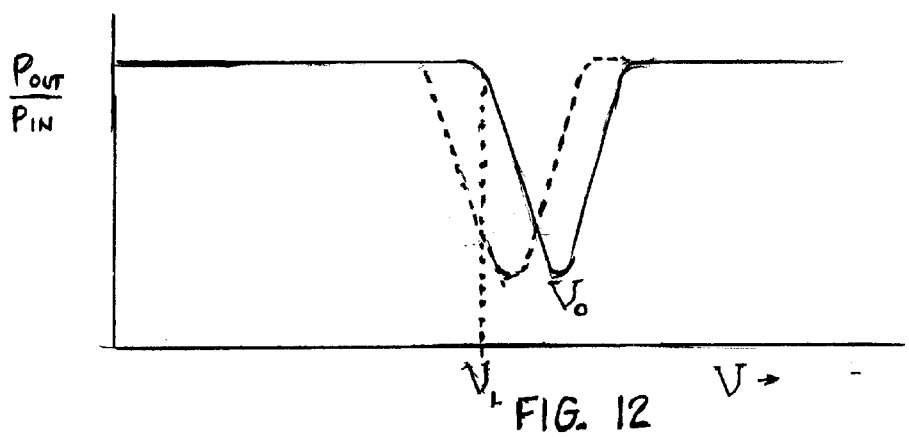
FIG. 12 is a graph showing the relation between transmission drop and resonance mode center frequency shift.

An alternative approach (mode of operation 5 described in summary) to modulation/switching is based upon varying the optical path length of the dielectric resonator itself under fixed resonator loss and coupling conditions necessary to obtain critical coupling. Referring now to FIGS. 11 and 12, this effect varies waveguide transmission loss by shifting the resonant frequency of a resonator 60 toward or away from the transmitted optical wave frequency. In the example shown, the surface of the resonator 60 is coated with a polymer material 62 which varies in refractive index depending on the electric field applied by an associated electrode pair 64, 65. The electric field is controlled by a signal source 66 so as to vary the coating 62 refractively, which in turn causes the resonant frequency of the resonator 60 to shift. In consequence, as seen in FIG. 11, a given optic wave frequency $V_L$ from a laser source remains constant but the WGM line center frequency $v_o$ for maximum resonance shifts, causing a degree of extinction of the transmitted optical wave that varies with the degree of shift. In this example, the resonator 60 is designed to provide full extinction at full coincidence (critical coupling), between $V_L$ and $v_o$ in FIG. 12

The WGM resonant frequency can also be modulated in other ways. For example, the material of the resonator can be chosen to vary in refractive index under optical or electrical excitation. Temperature variations can also be used in cases where modulation rates are very low.

Figure 13:
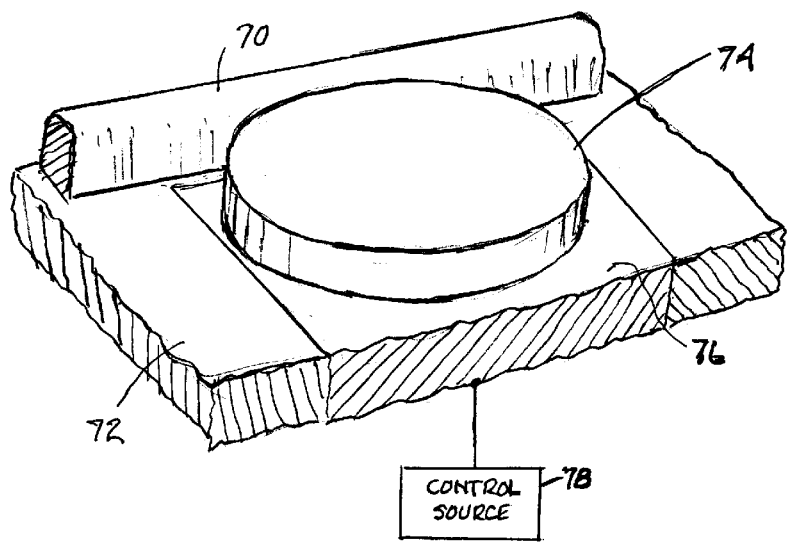
FIG. 13 is a fragmentary perspective view of a modulator in accordance with the invention employing a planar waveguide and a disc resonator.

Microlithographic fabrication techniques suitable for making optical waveguides and microresonators are now available that are based upon a number of different principles. As evidenced by the McCall and Ho et al patents referenced above, electro-optic WGM structures using layers of materials form controllable electro-optical devices with variable absorption (or gain) characteristics. As seen in FIG. 13, a narrow planar waveguide 70 comparable in waveguiding properties to a tapered optical fiber is built on a substrate 72 in evanescent coupling relation to the edge of a WGM disc 74, also built upon the substrate 72. A loss control element that is responsive to electrical signals or optical pumping could also be added on the substrate 72 adjacent the disc 74. Alternatively, the dielectric constant of the disc 74 could be changed to vary the resonant modes in the disc 74, as discussed above. For this purpose an area 76 of the substrate 72 is provided under and in contact with the disc 74, to shift the dielectric constant on the disc 74 in response to a control source 78 of modulating or switching signals. Microlithographic elements can be reliably made on a production basis, and with precise positioning of multiple elements can satisfy the packaging needs of complex DWDM systems. Since they can be serially coupled on a substrate, a substantial number of couplings to transmission fibers are not required.

Figure 15:
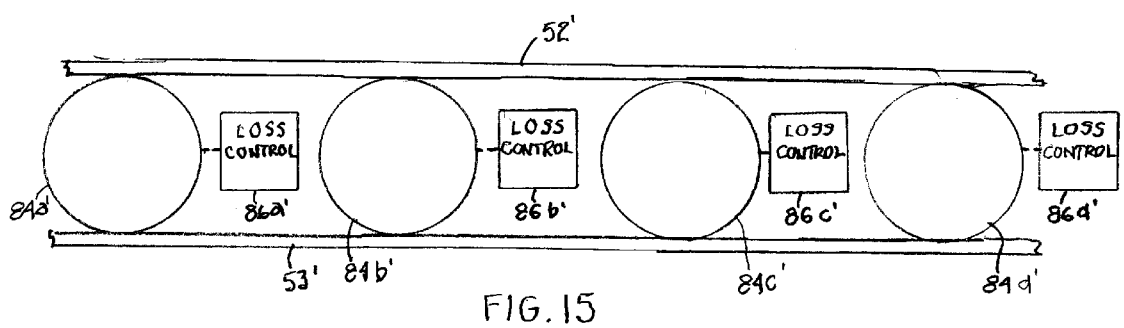
FIG. 15 depicts a system in which multiple resonators interact with two waveguides.
Figure 14:
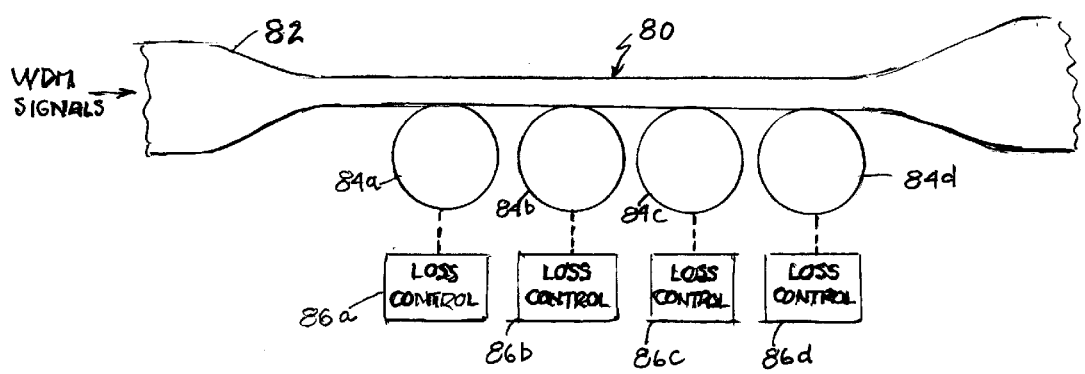
FIG. 14 is an example of how multiple modulators can be used with a common optical waveguide.

There are many systems configurations in which multiple frequencies must be separately modulated or switched, and a multi-modulator combination with the tapered waist 80 of a single optical fiber 82 is shown in FIG. 14. Each modulator resonator 84a, 84b, 84c; 84d is resonant at a different frequency corresponding to one in the WDM signals on the fiber 82, is disposed as part of a spaced series along the waist 80. Each modulator resonator 84a–d is separately modulated (or switched on and off) by a different loss control, 86a–d respectively, the system provides separate but non-interfering variation of the WDM components. It will be recognized that these waist regions need not be shared but can be at different positions along the length of a fiber transmission line. In the example of FIG. 15, the same idea is extended into a combination with the double tapered waveguide concept of FIG. 9. Because the two-spaced apart waveguide waists 52', 53' each interact with the different modulator resonators 84$a'$–$d'$; and can interact with each other as previously described such greater versatility in system design becomes feasible.

Figure 16:
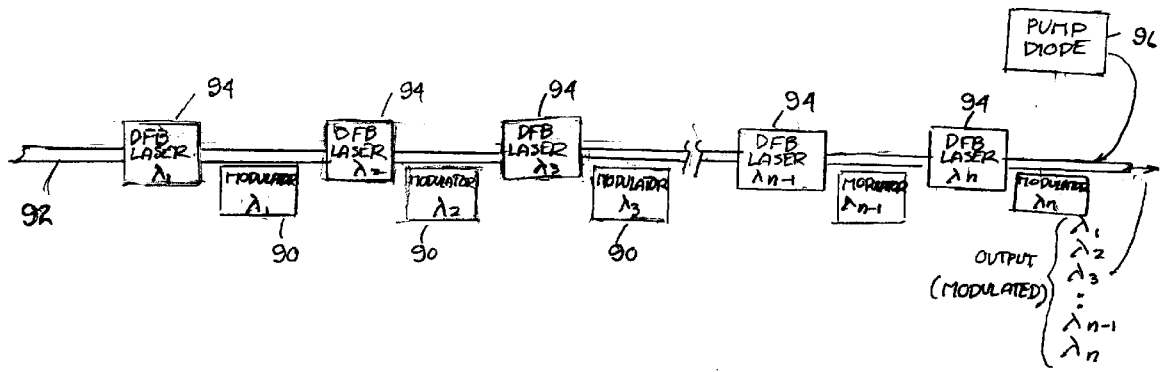
FIG. 16 is an example of an all-fiber source and modulator system.

The potential for WDM applications described immediately above is expandable to include active elements, such as tandem fiber lasers (e.g. DFB fiber lasers) in series with multiple resonator based modulators to form an all-fiber multi-wavelength system of modulators and sources. Referring now to FIG. 16, a fiber with tapered sections (not shown) each including a controlled microcavity modulator 90 and responsive to a selected wavelength, $\lambda_1, \lambda_2, \lambda_3 \ldots \lambda_{n-1}, \lambda_n$ disposed along an optical fiber 92 is alternated with in fiber DFB lasers 94, operating at like wavelengths. This creates a wavelength division multiplexed source having N channels. If N is not too large a single optical pump diode 96 can be used to pump the laser 94 in a counter-directional fashion, as shown (or in a co-directional fashion). While the modulators and fiber lasers are shown as alternating, they can also be arranged in serial sets, since they do not generate interfering signals in any event.

WGM resonators are resonant at a number of frequencies, and the separation to be established between them is dependent in part on the requirements of any associated multi-frequency system. Thus the frequency separation between resonances must be sufficiently large to prevent unintended modulation of waves co-propagated with the wave to be modulated. In a WDM system, the separation should encompass the bandwidth of all channels on the optical waveguide. For example, in a WDM system using 16 channels with 100 GHz channel separation a resonator modulator would need to have a modal frequency separation exceeding approximately 1.5 THz of bandwidth. Greater numbers of co-propagating waves on a WDM waveguide would necessarily require greater modal frequency separation. Such considerations affect resonator selection, as in the geometry of the microcavity. For example, to meet such separation requirements oblate spheroidal, disc and ring geometries would be preferable to microspheres.

The value of a completely in-line multiplexing system will be evident to those skilled in the art. Given that the frequency selectivity of the modulators combines with their transparency to all other signals, and that all components are of sizes of the order of microns, simplicity, freedom from mismatch and compactness are all achieved concurrently.

Figure 17:
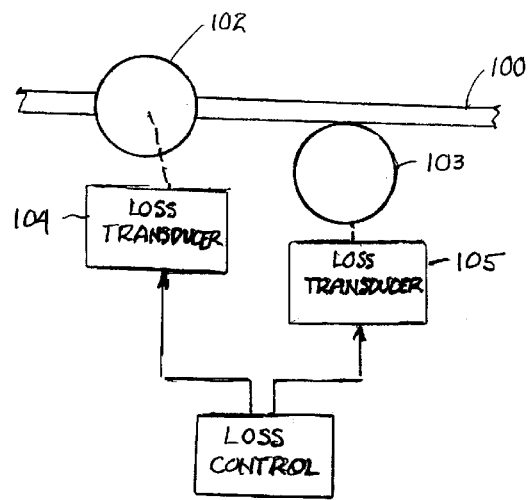
FIG. 17 is a generalized example of a polarization insensitive optical modulator or switch.

The transmission function of a WGM microcavity resonator is polarization dependent, because of the orientation needed for electromagnetic mode recirculation about the equator of the microcavity. Normally this is not of concern because the resonator can be placed in proper relation close to a laser source, which emits predominantly polarized optical waves. In systems where this is not feasible or other factors affect polarization, an arrangement such as that in FIG. 17 can be used. A tapered optical fiber 100 with a narrow waist region as previously described coacts with two resonators 102, 103, here microspheres, which are orthogonally separated about the circumference of the fiber 100. Each is associated with a different loss transducer 104, 105 properly oriented, that is varied by a loss control. Separate loss controls may be employed in some situations. Regardless of the vectorial direction or arbitrary state of polarization, this arrangement modulates or switches the optical wave energy as in the previous examples.

It will be appreciated that a substantial number of other expedients are made possible because of the capability for frequency selective power control afforded by the concepts of this invention. For example, where input optical power is itself modulated the power transduction at the resonator can be made to function as a detector. This means that the input optical waves in a WDM signal can be selectively converted to electrical signals without discontinuity being introduced into the optical transmission line.

It will also be recognized that optical gain (negative loss) instead of loss can be used to vary critical coupling in the modulator (see also discussion in summary section).

While there have been described above various forms and modifications, it will be appreciated that the invention is not limited thereto but encompasses all variations and expedients within the scope of the appended claims.

We claim:

1. An optical wave power control device for varying the transmitted power at at least one optical frequency (i.e. optical carrier wave) on an optical wave power transmission member, comprising:

an optical wave transmission member configured with a length of small cross-section for propagating optical power at at least one optical frequency in a spatial mode partially extending outside the cross-sectional periphery of the member;

at least one whispering gallery mode optical wave resonator disposed in coupling relation to the spatial mode of the wave transmission member, and positioned to exchange wave power between the spatial mode and a spatial mode of the resonator, and at least one control means, each in operative relationship to a different one of the at least one resonators, for varying round trip loss, $\alpha$, of at least one of the resonators relative to a critical coupling condition in the overcoupled regime.

2. An optical power control device as set forth in claim 1 above, where the control means is coupled to the spatial mode wave power of the resonator and variably absorbs optical wave power from the resonator spatial mode.

3. An optical wave power control device as set forth in claim 1 above wherein the member introduces round trip coupling losses in excess of the resonator intrinsic and parasitic losses such that the resonator is overcoupled and the added loss induced by the control means attains critical coupling within a small range of variation to effect maximum reduction in transmitted power.

4. An optical wave power control device as set forth in claim 1 above, wherein the control means is coupled to the spatial mode power of the resonator and variably transfers optical wave power from the resonator spatial mode.

5. An optical power control device as set forth in claim 1 above, wherein the resonator comprises a member having an approximately equatorial periphery with a diameter of less than about 1000 microns disposed in a position relative to the wave power transmission member to couple with wave power in the member and circulate resonant modes equatorially within the resonator.

6. An optical power control device as set forth in claim 5 above, where the resonator has a Q that is selected in accordance with the desired wavelength and bandwidth of the transmission that is being modified.

7. An optical power control device as set forth in claim 1 above, where the frequency separation of resonator modes is selected in accordance with the spectral extent spanned by the frequencies propagating in the member.

8. An optical power control device as set forth in claim 7 above wherein the resonator mode frequency separation is greater than 200 GHz.

9. An optical power control device as set forth in claim 6 above, where the resonator circumferential periphery diametral dimension is less than about 100 microns and has a Q in excess of 1000 in the 1550 nm telecommunications band.

10. An optical power control device as set forth in claim 1 above, wherein the transmission member is a planar waveguide and the resonator is a disc, a ring, or a closed loop.

11. An optical power control device as set forth in claim 1 above, wherein the transmission member is an optical fiber tapering to the length of small cross-section and the resonator is selected from the class comprising microspheres, discs, rings closed loops and oblate spheroids in close juxtaposition to the small cross-section length of the fiber.

12. An optical power control device as set forth in claim 1 above, wherein the optical power control device comprises a modulator responsive to a given optical frequency.

13. A control device as set forth in claim 1 above, wherein the at least one control means comprises a semiconductor element in coupling proximity to the resonator and responsive to a control signal for variably removing wave power circulating about the resonator.

14. A control device as set forth in claim 3 above, wherein the semiconductor element comprises a multi-layer photonic element of at least one layer of quantum well material insulated by barrier layers and responsive to applied signals to vary in optical characteristics.

15. A control device as set forth in claim 1 above, wherein the at least one control means comprises a semiconductor in contact with or near the resonator, and means for illuminating the semiconductor to change the optical characteristics.

16. A control device as set forth in claim 1 above, wherein the at least one control means comprises a semiconductor in contact with or near the resonator, and means for applying a controllable electrical field to the semiconductor to change the optical characteristics.

17. A control device as set forth in claim 1 above, wherein the power transmitted is varied monotonically between limits to modulate the transmitted wave power with data at a selected data rate.

18. A control device as set forth in claim 17 above, wherein the resonator has a Q in excess of 1000 in the 1550 nm telecommunications band, and the resonator has a diameter of less than 100 microns.

19. A control device as set forth in claim 1 above, wherein the optical wave transmission member propagates a number of different frequencies and wherein the device includes a plurality of resonators, ache resonant at a different one of the propagated frequencies and in coupling relation to the wave transmission member, and a plurality of control means, each disposed in relation to a different one of the resonators and controlling the resonator round trip loss thereat so as to vary power transmission at a selected frequency.

20. A control device as set forth in claim 19 above, wherein the wave transmission member comprises an optical fiber waveguide having at least one coupling length of small diameter such that wave energy is propagated in part outside the fiber surface, and a plurality of resonators disposed along the at least one coupling length in coupling relation to the member, each having resonant modes at a different one of the propagated frequencies.

21. A control device as set forth in claim 19 above, wherein the wave transmission member comprises a planar waveguide having at least one coupling length of small diameter such that wave energy is propagated in part outside the waveguide surface, and a plurality of resonators disposed along the at least one coupling length in coupling relation to a coupling length of the member, each having resonant modes at a different one of the propagated frequencies.

22. An optical power control device in accordance with claim 1 above, wherein the control means introduces loss variations between substantially full and substantially zero transmission such that at least one optical frequency is switched on and off.

23. An optical power control device in accordance with claim 1 above, wherein the wave transmission member propagates a number of different frequencies in a wavelength division multiplexed mode, wherein the device includes multiple resonators, each resonant at a different frequency, and wherein the control means selectively switches (i.e. blocks or admits) or modulates frequencies out of the multiplexed signals by varying transmission at each resonator.

24. An optical power control device in accordance with claim 1 above, wherein a plurality of resonators and associated control means arc disposed inline with the wave transmission member, each resonator and associated control means comprising a modulator operating at a different optical frequency in a set of optical frequencies, and further including a plurality of laser sources that arc in-line in the wave transmission member and transmitting different frequencies of the set in a downstream direction on the transmission member, and in which the modulator for each given frequency is downstream of the laser source for that frequency.

25. An optical power control device in accordance with claim 24 above, wherein the lasers and modulators alternate on the transmission member.

26. An optical power control device in accordance with claim 24 above, wherein the wave transmission member comprises an optical fiber waveguide and wherein the lasers comprise fiber lasers.

27. An optical power control device in accordance with claim 26 wherein the device further includes optical pump means for the lasers coupled into the transmission member.

28. An optical power control device in accordance with claim 1 above, wherein the wave transmission member comprises a single optical waveguide having a predetermined length in which there is an external field distribution, and wherein the at least one resonator comprises a number of resonators each responsive to a different frequency and each disposed along the predetermined length, and wherein the control means comprises a plurality of round trip loss varying controls, each operable with a different one of the resonators.

29. An optical wave power control device as set forth in claim 4 above, further comprising a second wave transmission member in coupling relation to the resonator and wherein the wave transmission members are optical fibers each including a taper region with a narrow waist in coupling relation to the resonator.

30. An optical wave power control device as set forth in claim 29 above, wherein the resonator comprises a closed loop, microsphere, oblate spheroid, disc, or ring.

31. An optical power control device as set forth in claim 4 above, wherein the control means includes a second wave transmission member in association with the resonator and the means for varying the power transfer comprises means for varying the coupling of resonator mode power into the second member and wherein at least one of the wave transmission members is an optical fiber and wherein the power transfer means between at least one of said wave transmission members and said resonator includes a taper region with a narrow waist in coupling relation to the resonator.

32. An optical power control device as set forth in claim 31 above, wherein the second member is a waveguide and the means for varying the power coupling includes means for varying the phase matching of the waveguide relative to the resonator mode.

33. An optical power control device as set forth in claim 32 above, wherein the waveguide comprises an electrooptic material and phase matching is varied by applying a voltage to the waveguide.

34. An optical power control device as set forth in claim 32 above, wherein the waveguide comprises an optically nonlinear material and phase matching is varied by optical means.

35. An optical power control device as set forth in claim 31 above wherein the loss associated with the control means induces critical coupling.

36. An optical power control device as set forth in claim 1 above, wherein the at least one resonator comprises at least two resonators, each resonant at a like frequency and each disposed at a different quadrant about the length of the wave transmission member.

37. An optical power control device at set forth in claim 36 above, wherein the wave transmission is of arbitrary polarization and the resonators have equatorial surfaces within which WGM modes circulate, the equatorial surfaces being in planes orthogonally disposed relative to each other, and the wave transmission member comprising a tapered fiber.

38. An optical power control device, comprising:
  a continuous length of optical wave power propagating member characterized by guided wave evanescent field extending outside the member for a portion of the member;
  at least one high Q optical wave recirculating device having a peripheral surface within the evanescent field of the member and exchanging wave power therewith, and
  a wave power control in association with the at least one recirculating device for controlling the round trip loss at the recirculating device to vary the wave power returned to the wave power propagating member from the resonator relative to the critical coupling condition in the overcoupled regime.

39. A control device as set forth in claim 38 above, wherein the recirculating device is a number of the class of wave power resonators characterized as whispering gallery mode devices and comprising spheres, discs, rings, loops, oblongs, ellipses and polygons, and wherein the wave power propagating member is of the class comprising optical fiber waveguides having at least one tapered region.

40. A control device as set forth in claim 38 above, wherein the recirculating device is a member of the class of wave power resonators characterized as whispering gallery mode devices and comprising spheres, discs, rings, loops, oblongs, ellipses and polygons, and wherein the wave power propagating member is of the class comprising planar optical waveguides.

41. An optical wave transmission control for in-line variation of power transmission on an optical waveguide comprising:
  a low loss optical wave power recirculating device having a periphery adjacent to the optical waveguide in a relation to couple wave power therefrom, the recirculating device also returning wave power to the optical waveguide, and
  a variable coupling device exterior to but operating with the recirculating device for varying the power returned to the optical waveguide from the recirculating device to vary power transmission on the optical waveguide without introducing discontinuities into the waveguide, the variable coupling device introducing losses per circulation round trip to establish critical coupling of a previously overcoupled resonator.

42. An optical wave transmission control as set forth in claim 41 above, wherein the variable coupling device interacts with the recirculating wave to absorb a portion of the recirculating wave energy per round trip.

43. The method of modifying the power level of a mono-wavelength signal in an optical waveguide comprising the steps of:
  transferring a pant of the power transmitted along the waveguide into a whispering gallery mode resonant at the transmitted wavelength; and
  returning power to the optical waveguide from the whispering gallery mode; introducing a controllable loss in the power of the whispering gallery mode to modify the power level in the transmitted signal in the waveguide wherein the intrinsic distributed and parasitic losses in whispering gallery mode operation are low, and less than the returning power losses and the controllable loss is applied to achieve critical coupling.

44. A method as set forth in claim 43 above, including the added steps of:
  distributing a portion of the electromagnetic power outside the waveguide;
  coupling the power outside the waveguide into the whispering gallery mode; and
  effecting the controllable loss while coupling power from the whispering gallery mode back to the waveguide.

45. A method as set forth in claim 44 above, wherein the waveguide transmitted power is non-polarized and wherein the step of introducing the controllable loss includes establishing at least two whispering gallery modes in which power circulates in planes that are orthogonally disposed relative to each other.

46. A method of modulating or switching light at a single wavelength along the continuous optical waveguide comprising the steps of:
  propagating a guided part of the optical power along but partly outside the waveguide;
  transferring a portion of the power that is outside the waveguide into a high Q recirculating path in which a portion extends outwardly from the recirculating path;
  returning power from the extending portion of the recirculating path to the optical waveguide; and
  introducing loss to the extending portion of the recirculating power in controlled fashion to modulate the power propagated along the waveguide;
  wherein the power propagated along the waveguide is substantially attenuated from unity value by introducing loss in the resonator thereby establishing a critical coupling loss in the power in the recirculating path.

47. A method as set forth in claim 46 above, further including the steps of limiting power in the recirculating path to modes resonant at one or more frequencies and building up recirculating power at the resonant modes.

48. The method of modulating optical power within a tapered fiber optical waveguide comprising the steps of:
  coupling at least some transmitted power from the waveguide into at least one recirculating wave power path resonant at least one frequency,
  coupling recirculating power back to the optical waveguide, and removing a controlled amount of power from the at least one recirculating path to modulate optical power transmission along the waveguide.

49. A method as set forth in claim 48 above, wherein the optical power transmitted comprises a single wavelength signal and wherein the step of recirculating is resonant at that wavelength.

50. A method as set forth in claim 48 above, wherein the optical power transmission comprises at least two different wavelength signals and the step of absorbing power from the at least one recirculating path comprises absorbing power from the different wavelengths.

51. A signal amplitude modifier for use at optical wavelengths comprising:

a waveguide for conducting optical power, the waveguide including at least a segment in which propagated power is partially distributed adjacent the waveguide;

a low loss, optical power recirculating device disposed to couple a portion of the power distributed adjacent the waveguide into the device for cumulative recirculation therein, the recirculating device operating in the overcoupled regime and generating an external field coupling power propagated therewithin back to the waveguide; and loss control means disposed in association with the recirculating power device for removing power from the external field about the recirculating device during recirculation to modify the amplitude of the optical power propagated along the waveguide.

52. The invention as set forth in claim 51 above, wherein the loss control means comprises a circuit substrate and the recirculating device is disposed on the substrate.

53. The invention as set forth in claim 51 above, wherein the waveguide comprises an optical fiber having a narrow waist region, the recirculating device being attached to the waist region.

54. The invention as set forth in claim 53 above, wherein the optical fiber has a reduced diameter waist region of no greater than about 10 microns and tapered transition sections integral therewith joining to the optical fiber waveguide at each end.

55. The invention as set forth in claim 51 above, wherein the input optical power is not necessarily polarized, including at least two optical power recirculating devices disposed adjacent the waveguide segment, in interchange relation with power distributed about the segment, and each being in power interchange relation with the loss control means, such that modification of optical power in the waveguide is independent of polarization.

56. The invention as set forth in claim 51 above, wherein the amplitude modifier includes a number of wave power recirculating devices, each disposed along the wave distributing segment of the waveguide in power interchange relation with the distributed field thereabout, and each responsive to a different wavelength signal.

57. A modulator for use with an optical fiber transmission system, comprising:

an optical fiber having a narrow waist providing exterior waveguided power thereabout, the wave power having a selected nominal frequency;

an optical resonator disposed in close proximity to the waist in communication with the exterior waveguided energy, the resonator being configured to be resonant at the selected nominal frequency and the communication with the waist including power return to the fiber, and wherein the resonator comprises a whispering galleon mode device comprising an element having an equatorial periphery in which the recirculating energy is confined with an extended but guided distribution outside the periphery, and loss control means in communication with the recirculating resonator, for introducing a loss to thereby establish critical coupling of a previously overcoupled resonator.

58. A modulator as set forth in claim 57 above, wherein the resonator comprises a microsphere, oblate spheroid, ring, loop or disc.

59. Apparatus for controlling power transmission of combinations of a number of different optical frequencies on an optical waveguide comprising:

a waveguide capable of propagating the different frequencies and characterized by at least one coupling section having field propagation partially outside the surface of the waveguide;

a plurality of whispering gallery mode resonators disposed adjacent the coupling section of the waveguide and coupled thereto, each resonator having a resonant mode at a different one of the optical frequencies and each coupling back to the waveguide, and a plurality of means, each coupled to a different one of the resonators, for independently varying the round trip loss in the overcoupled regime in at least one resonator to vary signals at that frequency returned to the waveguide such as to separately switch off that frequency on command.

60. Apparatus as set forth in claim 59 above, wherein the resonators have Q values that are selected in accordance with signal frequency, bandwidth and mode frequency separation in accordance with the general spectral extent of the optical frequencies.

61. Apparatus as set forth in claim 59 above, wherein the whispering gallery mode resonators arm discs, rings, loops, spheres, or oblate spheroids.

62. Apparatus as set forth in claim 59 above, wherein the waveguide is an optical fiber which has a reduced diameter waist region or regions.

63. A system for generating and controlling multiple optical signals of different wavelengths on a single optical waveguide capable of propagating multiple wavelengths within a chosen bandwidth, comprising:

an optical waveguide having at least two integral lengths with partially external distributions of guided wave power, the optical waveguide also including at least two in-waveguide optical power sources operating at different wavelengths in the chosen bandwidth;

at least two optical resonators, each being resonant at a different one of the wavelengths in the chosen bandwidth and each being disposed in coupling relation to a different integral length of the optical waveguide and coupled thereto, and a control system optically coupled to each of the resonators for controlling power loss thereat in the overcoupled regime in as least one resonator, whereby propagated power at different wavelengths is separately controlled in the single optical waveguide.

64. A system as set forth in claim 63 above, wherein the optical waveguide is an optical fiber and the at least two integral lengths comprise narrow waist sections having integral tapered transitions to the fiber, and the resonators are internally reflecting volumes of optical material that recirculate optical waves at the individual chosen wavelengths, and have an edge coupled into the externally distributed portion of the guided wave energy.

65. A system for controlling the amplitude level of optical signals of a chosen wavelength transmitted along a waveguiding element with undefined polarization comprising:
- a coupling length of the wave guiding element which is dimensioned and configured to establish a partially exterior distribution of guided wave power;
- a pair of resonators of the whispering gallery mode type disposed along the coupling length of the waveguiding element in coupling from and to the exterior distributed wave power, the resonators being orthogonally disposed relative to the propagation axis of the coupling length and resonant at the chosen wavelength, and
- loss control means associated with each of the resonators for introducing controllable loss in the wave power recirculated at the resonators, such that the propagated signals are controlled regardless of their polarization.

66. A system as set forth in claim 65 above, wherein the waveguiding element is an optical fiber having a narrow section in which waveguiding is maintained partially within and partially adjacent the fiber, and wherein the resonators are volumetric microcavities having equatorial peripheries lying in planes which are radial to the fiber and orthogonal to each other, such that whatever the orientation of the polarization vector the controlled amplitude level is in accordance with the desired controllable loss.

67. A system for controllably varying the signal transmission in an optical waveguide without transitions in a coupling to the waveguide itself, comprising:
- an optical waveguide having an integral coupling section therein in which an exterior portion of waveguided energy extends into the surrounding environment, the waveguide being selected from the class including optical fibers and optical planar waveguides;
- a dielectric optical microcavity member supporting at least one mode internally at at least one resonant frequency, the microcavity member protruding into the extending waveguided energy and coupling optical waves partially from and back into the waveguide, wherein the microcavity member is selected from the class comprising microspheres, discs, loops, and rings of circular and non-circular geometry, and
- means associated with the microcavity member for introducing round trip loss in an overcoupled condition into the supported mode and thereby varying the signal transmission in the optical waveguide widely for relatively small loss changes.

68. An optical wave power control device for varying the transmitted power at least one optical frequency (i.e. optical carrier wave) on an optical wave power transmission member comprising:
- an optical wave transmission member configured for propagating the guiding optical power at at least one optical frequency and including a length of narrowed cross-section joined by integral fiber tapers to the principal length of the member; and
- at least one optical wave resonator disposed in coupling relation to the narrowed cross-section length of the transmission member, positioned to couple wave power from and to the member, and in frequency resonance with a selected optical wave propagating on the transmission member to recirculate waves at that frequency, and
- at least one control means, each in operative relationship to a different one of the at least one resonators, for varying the component of round trip resonator loss distinct from the loss associated with the member coupling such that the optical wave transmitted in the wave transmission member is varied in power level in the overcoupled regime.

69. An optical wave power control device as set forth in claim 68 above, wherein the loss is varied by varying the absorption of the resonator mode.

70. An optical wave power control device as set forth in claim 69 above, wherein the absorption is produced by a semiconductor structure and varied by applying an electric field, optical power, injection current or voltage to the semiconductor.

71. An optical wave power control device as set forth in claim 68 above, wherein the at least one control means varies round trip loss by varying the coupling of resonator mode power into another member or structure.

72. An optical wave power control device as set forth in claim 71 above, wherein the structure is a second waveguide whose phase matching to the resonator mode is varied to control power coupling between at least one optical wave resonators and the optical wave power transmission member.

73. An optical wave power control device as set forth in claim 72 above, wherein the waveguide is composed of an electrooptic material and phase matching is varied by applying a voltage to the waveguide.

74. An optical wave power control device as set forth in claim 72 above, wherein the waveguide is composed of an optically nonlinear material and phase matching is varied by optical means.

75. An optical wave power control device as set fort in claim 68 above, wherein the at least one control means generates and varies a component of round-trip negative resonator loss (optical gain) that is distinct from the resonator loss associated with the member coupling.

76. An optical wave power control device as set forth in claim 75 above, wherein the optical gain is provided by the resonator.

77. An optical wave power control device as set forth in claim 68 above, wherein the resonator and member introduce components of round-trip resonator loss such that the resonator is over-coupled and the loss associated with the control means induces critical coupling.

78. An optical wave power control device as set forth in claim 68 above, wherein the resonator and member introduce components of round-trip resonator loss such that the resonator is critically coupled and the loss associated with the control means induces under coupling.

79. An optical wave power control device as set forth in claim 75 above, wherein the resonator and member introduce components of round-trip resonator loss such that the resonator is critically coupled and the optical gain associated with control means induces over coupling.

80. An optical wave power control device as set forth in claim 68 above, wherein the optical wave transmission member propagates a number of different frequencies and wherein the device includes a plurality of resonators, each resonant at a different one of the propagated frequencies and in coupling relation to the wave transmission member, and a plurality of control means, each disposed in relation to a different one of the resonators and controlling a progeny of the resonator thereat so as to vary power transmission at a selected frequency.

81. An optical power control device in accordance with claim 68 above, wherein a plurality of resonators and associated control means are disposed inline with the wave transmission member, each resonator and associated control means comprising a modulator operating at a different optical frequency in a set of optical frequencies, and further including a plurality of laser sources that are in-line in the wave transmission member and transmitting different frequencies of the set in a downstream direction on the transmission member, and in which the modulator for each given frequency is downstream of the laser source for that frequency.

82. An optical wave power control device for varying the transmitted power at least one optical frequency (i.e. optical carrier wave) on an optical wave power transmission member, comprising:

an optical wave transmission member configured with a length of small cross-section for propagating optical power at at least one optical frequency in a spatial mode partially extending outside the cross-sectional periphery of the member;

at least one whispering gallery mode optical wave resonator disposed in coupling relation to the spatial mode of the wave transmission member, and positioned to exchange wave power between the spatial mode and a spatial mode of the resonator, and, at least one control means, each in operative relationship to a different one of the at least one resonators, for varying round trip loss, $\alpha$, of at least one of the resonators relative to a critical coupling condition in the overcoupled regime, at least one of said control means including a second waveguide being coupled to the spatial mode power of the resonator and including means for varying the phase matching of the second waveguide relative to the resonator mode so as to variably transfer optical wave power from the resonator spatial mode to the second waveguide.

83. An optical power control device as set forth in claim 82 above, wherein the waveguide comprises an electrooptic material and phase matching is varied by applying a voltage to the waveguide.

84. An optical power control device as set forth in claim 82 above, wherein the waveguide comprises an optically nonlinear material and phase matching is varied by optical means.

* * * * *